(12) United States Patent
Ramsden et al.

(10) Patent No.: US 9,321,108 B2
(45) Date of Patent: Apr. 26, 2016

(54) NANOWIRE PREPARATION METHODS, COMPOSITIONS, AND ARTICLES

(75) Inventors: William D. Ramsden, Afton, MN (US); Doreen C. Lynch, Afton, MN (US); Junping Zhang, Saint Paul, MN (US)

(73) Assignee: Carestream Health, Inc., Rochester, NY (US)

( * ) Notice: Subject to any disclaimer, the term of this patent is extended or adjusted under 35 U.S.C. 154(b) by 426 days.

(21) Appl. No.: 13/205,080

(22) Filed: Aug. 8, 2011

(65) Prior Publication Data

US 2012/0063948 A1    Mar. 15, 2012

Related U.S. Application Data

(60) Provisional application No. 61/381,189, filed on Sep. 9, 2010.

(51) Int. Cl.
| | |
|---|---|
| *B22F 9/24* | (2006.01) |
| *B82Y 40/00* | (2011.01) |
| *C22B 5/00* | (2006.01) |
| *B22F 1/00* | (2006.01) |
| *B82Y 30/00* | (2011.01) |

(52) U.S. Cl.
CPC . *B22F 9/24* (2013.01); *B22F 1/004* (2013.01); *B22F 1/0025* (2013.01); *B82Y 30/00* (2013.01); *B82Y 40/00* (2013.01); *C22B 5/00* (2013.01)

(58) Field of Classification Search
CPC .............. B22F 9/24; B82Y 40/00; C22B 5/00
USPC .................... 75/343, 370, 373, 392; 977/840
See application file for complete search history.

(56) References Cited

U.S. PATENT DOCUMENTS

2009/0130433 A1    5/2009    Takada

OTHER PUBLICATIONS

Chen et al. "The influence of seeding conditions and shielding gas atmosphere on the synthesis of silver nanowires throught the polyol process." Nanotechnology 17 (2006) 466-474. Published Dec. 21, 2005.*
Chen et al. "Study on the synthesis of silver nanowires with adjustable diameters through the polyol process." Nanotechnology 17 (2006) 3933-3938. Published Jul. 11, 2006.*
Younan Xia, et al., "Shape-Controlled Synthesis of Metal Nanocrystals: Simple Chemistry Meets Complex Physics?," Angew. Chem. Int. Ed., 2009, vol. 48, pp. 60-103.
Jinting Jiu, et al., "Preparation of Ag nanorods with high yield by polyol process," Materials Chemistry and Physics, vol. 114, 2009, pp. 333-338.
Yugang Sun, et al., "Polyol Synthesis of Uniform Silver Nanowires: A Plausible Growth Mechanism and the Supporting Evidence," Nano Letters, 2003, vol. 3, No. 7, pp. 955-960.
Pierre-Yves Silvert, et al., "Preparation of colloidal silver dispersions by the polyol process—Part 1—Synthesis and characterization," J. Mater. Chem, 1996, vol. 6, No. 4, pp. 573-577.
Pierre-Yves Silvert, et al., "Preparation of colloidal silver dispersions by the polyol process—Part 2—Mechanism of particle formation," J. Mater. Chem. 1997, vol. 7, No. 2, pp. 293-299.
Benjamin Wiley, et al., "Shape-Controlled Synthesis of Metal Nanostructures: The Case of Silver," Chem. Eur. J., 2005, vol. 11, pp. 454-463.
Yugang Sun, et al., "Large-Scale Synthesis of Uniform Silver Nanowires Through a Soft, Self-Seeding, Polyol Process," Adv. Mater., 2002, vol. 14, No. 11, pp. 833-837.
International Search Report, International application No. PCT/US2011/047188, Oct. 31, 2011, 2 pages.
Korte et al., "Rapid synthesis of silver nanowires through a CuCl- or $CuCl_2$-mediated polyol process", J. Matter. Chem., 2008, vol. 18, pp. 437-441.
Wiley et al., "Synthesis of Silver Nanostructures with Controlled Shapes and Properties", Accounts of Chemical Research, vol. 40, No. 10, 2007 pp. 1067-1076.
Zhang et al., "Self-organized formation of silver nanowires, nanocubes and bipyramids via a solvothermal methods", ACTA Materialia, vol. 56, No. 11, Jun. 2008, pp. 2508-2513.
Tang et al., "Rapid and high-yield synthesis of silver nanowires using air assisted poluol method with chloride ions", Colloids and Surfaces, A Physicachemical and Engineering Aspects, vol. 338, No. 1-3. Apr. 2009, pp. 33-39.
Chen et al., "large-scale synthesis of silver nanowires via a solvothermal method", Journal of Matierlas Science: Materials in Electronics, vol. 22, No. 1, Feb. 2010, pp. 6-13.

* cited by examiner

*Primary Examiner* — Brian Walck
(74) *Attorney, Agent, or Firm* — Reed L. Christiansen

(57) ABSTRACT

Preparation methods, compositions, and articles are disclosed and claimed. Methods for reducing metal ions to metals, the metal products, and articles comprising the metal products are claimed. Such methods show improved reproducibility upon scale-up than previous methods, resulting in products that exhibit reduced variability. The claimed inventions are useful for electronic and optical applications.

6 Claims, No Drawings

NANOWIRE PREPARATION METHODS, COMPOSITIONS, AND ARTICLES

CROSS REFERENCE TO RELATED APPLICATIONS

This application claims the benefit of U.S. Provisional Application No. 61/381,189, filed Sep. 9, 2010, entitled PROCESS FOR PREPARATION OF SILVER NANOWIRES, which is hereby incorporated by reference in its entirety.

BACKGROUND

The general preparation of silver nanowires (10-200 aspect ratio) from silver ions is known. See, for example, Y. Xia, et al., *Angew. Chem. Int. Ed.* 2009, 48, 60, and J. Jiu, et al., *Mat. Chem. & Phys.,* 2009, 114, 333, each of which is hereby incorporated by reference in its entirety. These include the "polyol" process, in which a silver salt is heated in a polyol (typically ethylene glycol (EG)) in the presence of polyvinylpyrrolidinone (PVP, also known as polyvinylpyrrolidone), yielding a suspension of AgNW in EG, from which the wires can be isolated and/or purified as desired.

H. Takada describes in U.S. Patent Application Publication 2009/0130433 a process for preparing metal nanowires by forming a nucleus metal particle.

Y. Sun, B. Mayers, T. Herricks, and Y. Xia (*Nano Letters,* 2003, 3(7), 955-960) proposed that AgNW are the result of the growth of multiply twinned particles (MTP) of silver metal.

P.-Y. Silvert et al. (*J. Mater. Chem.,* 1996, 6(4), 573-577 and *J. Mater. Chem.,* 1997, 7, 293-299), each of which is hereby incorporated by reference in its entirety, described the formation of colloidal silver dispersions in EG in the presence of PVP.

Previous methods of preparing silver nanowires tend to produce products with non-uniform morphologies. Such variability has been seen to increase as such methods are scaled-up.

SUMMARY

At least some embodiments provide methods comprising reducing at least one first portion of at least one first reducible metal ion in the presence of at least one protecting agent to form at least one first composition, and reducing at least one second portion of the at least one first reducible metal ion in the presence of the at least one first composition to form at least one first metal product.

In some cases, the at least one first metal ion may comprise at least one coinage metal ion or at least one ion from IUPAC Group 11. An exemplary first metal ion is a silver ion.

The at least one protecting agent may, in some embodiments, comprise one or more polymer, surfactant, or acid. An exemplary protecting agent is polyvinylpyrrolidinone, also known as polyvinylpyrrolidone or PVP.

In at least some embodiments, the at least one first composition may comprise silver particles, such as, for example, silver particles having a largest dimension less than about 50 nm, or less than 50 nm. Such silver particles may, in some cases, comprise multiply-twinned particles. For example, at least about 75 number percent or at least 75 percent of such silver particles may be multiply-twinned particles.

In at least some embodiments, such methods may further comprise combining the at least one first composition with at least one polyol. In at least some cases, the at least one polyol may comprise one or more of ethylene glycol or propylene glycol.

In at least some embodiments, the reducing the at least one second portion may be performed in the presence of at least one second metal ion. In at least some cases, the at least one second metal ion may, for example, comprise at least one iron ion.

In at least some embodiments, the reducing the at least one second portion may be performed in the presence of at least one chloride ion.

Other embodiments provide the at least one metal product produced according to such methods. In some cases, the at least one metal product may, for example, comprise at least one silver nanowire.

Still other embodiments provide articles comprising such metal products.

These and other embodiments may be understood from the description, exemplary embodiments, examples, and claims that follow.

DESCRIPTION

All publications, patents, and patent documents referred to in this document are incorporated by reference herein in there entirety, as though individually incorporated by reference.

U.S. Provisional Application No. 61/381,189, filed Sep. 9, 2010, is hereby incorporated by reference in its entirety.

Introduction

Silver nanowires (AgNW) are a unique and useful wire-like form of the metal in which the two short dimensions (the thickness dimensions) are less than 300 nm, while the third dimension (the length dimension) is greater than 1 micron, preferably greater than 10 microns, and the aspect ratio (ratio of the length dimension to the larger of the two thickness dimensions) is greater than five. They are being examined as conductors in electronic devices or as elements in optical devices, among other possible uses.

A number of procedures have been presented for the preparation of AgNW. See, for example, Y. Xia, et al. (*Angew. Chem. Int. Ed.* 2009, 48, 60), which is hereby incorporated by reference in its entirety. These include the "polyol" process, in which a silver salt is heated in a polyol (typically ethylene glycol (EG)) in the presence of polyvinylpyrrolidinone (PVP, also known as polyvinylpyrrolidone), yielding a suspension of AgNW in EG, from which the wires can be isolated and/or purified as desired.

While small scale preparations of AgNW have been reported, replication of these procedures is often difficult and scaling up these procedures to produce larger quantities of wires (as needed for some of the envisioned applications) typically results in inferior material.

Among the traits of this inferior material are: higher levels of metal particles with an aspect ratio below five (non-wire-shaped particles herein referred to simply as particles), AgNW which are shorter on average than desired, and AgNW which are thicker on average than desired. A scalable process is clearly desirable.

Applicants have recognized that colloidal silver dispersions, prepared, for example, by the procedures of Silvert et al. can be excellent templates or seeds from which to grow AgNW. Silver seeds prepared by such methods have been isolated and characterized by transmission electron microscopy (TEM), and have been found to comprise predominately multiply twinned particles (MTPs). While not wishing to be bound by theory, such MTPs may influence the shape of the final nanowire product. See, for example, B. Wiley, et al.,

*Chem. Eur. J.*, 2005, 11, 454-464, and Y. Sun, et al., *Nano Letters*, 2003, 3, 955-960, each of which is hereby incorporated by reference in its entirety.

AgNW have been prepared by adding such seeds to hot ethylene glycol, followed simultaneously by solutions of silver nitrate and PVP in ethylene glycol. After holding such mixtures at elevated temperature, suspensions of AgNW in ethylene glycol have been obtained. Such AgNW have been isolated by standard methods, including centrifugation and filtration.

Previous AgNW preparations such as those disclosed by Takada employ an in situ approach to preparing seeds (e.g., the addition of silver nitrate to hot EG, just prior to the main addition of the silver nitrate and the PVP solutions), or they employ no separate seeding step at all (see, for example, Y. Sun and Y. Xia, *Adv. Mater.* 2002, 14(11), 833-837). While these previous methods may yield AgNW, their morphological purity is highly variable. High and/or variable levels of non-wire particles may also be formed, decreasing the yield of the desired nanowires and requiring additional purification steps.

Applicants have also observed that this morphological variability is exacerbated as the scale of the procedure is increased. In contrast, the addition of silver "seeds" results in AgNW preparations with reproducibly low levels of non-wire particles, even as the production scale is increased.

Some embodiments provide methods to prepare silver nanowires comprising at least two stages:

In a first stage or stages, preparation of a colloidal silver dispersion in which said dispersed silver particles have a largest dimension less than 50 nm and more than 75 number % of said silver particles are multiply twinned particles, In a second stage or stages, adding said colloidal silver dispersion to a heated polyol under an inert atmosphere, followed by addition of a solution or solutions of a silver salt and PVP in a polyol under conditions which grow nanowires from the colloidal silver dispersion particles, and holding the mixture at an elevated temperature to complete the nanowire growth. Such processes can provide nanowire products that retain uniformity as the processes are scaled-up to larger production volumes.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, in some cases, be provided as silver nitrate.

In such embodiments, the at least one metal is that metal to which the at least one reducible metal ion is capable of being reduced. For example, silver would be the metal to which a silver cation would be capable of being reduced.

Preparation Methods and Materials

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Applicants have observed that reproducibility can be improved and variability reduced if such metal cation reduction is carried out in at least two stages.

In the first stage or stages, a first reduction of a first portion of at least one first metal ion is carried out in the presence of at least one protecting agent, such as, for example, polyvinylpyrrolidinone (PVP, also known as polyvinylpyrrolidone), other polar polymers or copolymers, surfactants, acids, and the like, to form at least one first composition. In at least some embodiments, such a first composition may comprise colloidal silver dispersions, prepared, for example, by the procedures of Silvert et al. Such silver dispersions may comprise silver particles having a largest dimension less than about 50 nm. In some cases, at least about 75 number percent of such silver particles may be multiply-twinned particles. Such a reduction may be carried out in a reaction mixture that may, for example, comprise one or more polyols, such as, for example, ethylene glycol (EG), propylene glycol, butanediol, glycerol, sugars, carbohydrates, and the like. These and other components may be used in such reaction mixtures, as is known in the art. The reduction may, for example, be carried out at one or more temperatures from about 80° C. to about 190° C., or from about 120° C. to about 190° C.

In the second stage or stages, a second reduction of a second portion of the at least one first metal ion is carried out in the presence of the at least one first composition. Such a reduction may be carried out in the presence of at least one second metal ion, such as, for example, at least one iron ion. The reduction may be carried out in the presence of at least one chloride ion. Such chloride ions may, for example, be provided by salts, such as sodium chloride, tetraalkylammonium chloride, ammonium chloride, and the like. Or, in other cases, the at least one metal ion and the at least one chloride ion may be provided by metal chlorides, such as chlorides of iron (II), iron(III), copper(II), copper (III), tin (II), and the like. Such reductions may be carried out in the presence of one or more protecting agents or polyols, such as those described for use in the first stage or stages. These and other components may be used in such reaction mixtures, as is known in the art. The reduction may, for example, be carried out at one or more temperatures from about 120° C. to about 190° C.

Nanostructures and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Exemplary Embodiments

The following eleven non-limiting exemplary embodiments were disclosed in U.S. Provisional Application No. 61/381,189, filed Sep. 9, 2010, which is hereby incorporated by reference in its entirety.
A. The polyol may, in some cases, be ethylene glycol or propylene glycol.
B. The amount of silver in the colloidal silver dispersion may, in some cases, be between 0.001 and 1 mole % of the total silver.
C. The silver salt may, for example, be silver nitrate.
D. An iron salt may be added to the heated polyol. Examples of such iron salts include iron(II) chloride and iron acetonylacetate.
E. A chloride salt may be added to the heated polyol. Examples of such chloride salts include iron(II) chloride or sodium chloride.
F. The PVP and silver salt solutions may, in some cases, be added as separate solutions at substantially the same rate.
G. The mole ratio of PVP to silver nitrate may, in some cases, be 1:1 to 10:1.
H. The reaction temperature may, in some cases, be between about 130° C. and about 170° C., or, for example, between about 135° C. and about 150° C.
I. The reaction may be stirred throughout.
J. The nanowires may be isolated or purified, for example, by centrifugation, removal of the supernatant, addition of solvent(s), and re-dispersion.
K. The nanowires so produced may have an average diameter of about 50 to about 150 nm, or about 60 to about 110 nm, or about 80 to about 100 nm.

EXAMPLES

Example 1 (Comparative)

To 100 mL of stirred ethylene glycol (EG) at 164° C. was added 10 mL of $1.5 \times 10^{-4}$ M silver nitrate in EG over 10 sec. After 6 min, a solution of 5.583 g of polyvinylpyrrolidone (PVP) (55,000 molecular weight) and 1.695 g of silver nitrate in 200 mL of ethylene glycol was added dropwise over 199 min while the temperature was held at 159 to 165° C. Examination of the product solution by optical microscopy at 400× showed only non-wire shaped particles of silver metal, none larger than 3 microns.

Example 2 (Comparative)

This example demonstrates variability at smaller scale. Two identical reactions were run at smaller scale as follows: To a mixture of 200 mL of EG and 1.28 mL of 0.006 M iron(II) chloride tetrahydrate in EG under a nitrogen atmosphere, heated and stirred at 145° C., was added simultaneously in two streams 60 mL each of 0.094 M silver nitrate in EG and 0.282 M PVP in EG over 25 min. After an additional 90 min at 145° C., each reaction was sampled and examined by optical microscopy at 400×. The first reaction produced predominately 1 micron and smaller non-wire particles, containing only a few short (under 10 microns) wires, while the second reaction produced myriad wires, some as long as 100 microns, many 10 to 30 microns long, and only a few non-wire particles.

Example 3 (Comparative)

This example demonstrates variability at larger scale. Five identical reactions were run at larger scale as follows: To a mixture of 3003 mL of EG and 19.2 mL of 0.006 M iron(II) chloride tetrahydrate in EG under a nitrogen atmosphere, heated and stirred at 145° C., was added simultaneously in two streams a solution of 14.47 g of silver nitrate in 905 mL of EG and a solution of 83.76 g of PVP in 905 mL of EG over 25 min. All solutions were sparged with nitrogen for at least 1 hr before use. After holding an additional 90 min at 145° C., each mixture was cooled in an ice/water bath, diluted with an equal volume of acetone and centrifuged at 200 G for 45 min. Each supernatant was decanted and discarded, the residue redispersed in isopropanol by shaking, and the mixture centrifuged again as above. Three more cycles of supernatant removal, redispersion in isopropanol, and centrifugation were repeated to give the final products. Results: The first and second reactions produced many wires of length 30-100 microns, a few shorter wires, and few particles. The third reaction produced wires less than 40 microns long and a few wires up to 60 microns in length, as well as many particles. The fourth reaction produced 20 micron wires with a few wires up to 80 microns in length, as well as many particles. The fifth reaction produced many 20-40 micron wires with many particles.

Example 4 (Comparative)

This example demonstrates difficulty in scaling-up methods employing in situ formed silver seeds. In this example, a procedure which gave a good yield of AgNW without significant non-wire particle formation, gave much shorter, heavily particle-contaminated wires on scaling it up by a factor of 15. All solutions were sparged with nitrogen before use.

To a mixture of 200 mL of EG and 1.28 mL of 0.006 M iron(II) chloride tetrahydrate in EG under a nitrogen atmosphere, heated and stirred at 145° C., was added 0.06 mL of 0.282 M (based on polymer repeat units) PVP in EG followed 1 min later by the addition of 0.06 mL of 0.094 M AgNO3 in EG. The mixture was held at 145° C. for 30 min, and then were added simultaneously in two streams 60 mL each of 0.094 M silver nitrate in EG and 0.282 M PVP in EG over 25 min. After an additional 90 min at 145° C., the reaction was cooled and worked up as in Example 3 to give a product with wires predominately 20-40 microns in length, with very few particles.

An attempt was made to scale-up this procedure. To a mixture of 3003 mL of EG and 19.2 mL of 0.006 M iron(II) chloride tetrahydrate in EG under a nitrogen atmosphere, heated and stirred at 145° C., was added sequentially 9 mL of 0.282 M (based on polymer repeat units) PVP in EG and 9 mL of 0.094 M AgNO3 in EG. The mixture was held at 145° C. for 31 min, and then were added simultaneously in two streams a solution of 14.47 g of silver nitrate in 905 mL of EG and a solution of 83.76 g of PVP in 905 mL of EG over 25 min. All solutions were sparged with nitrogen for at least 1 hr before use. After holding an additional 90 min at 145° C., the reaction was cooled and worked up as in Example 3 to give the product: wires mostly 2-20 microns in length, with few longer, with a significant level of non-wire particles.

Example 5

Silver Seeds Preparation

Silver seeds were prepared similarly to the process of Silvert (P.-Y. Silvert et al., *J. Mater. Chem.*, 1996, 6(4), 573-577), experiment 1. Thus, to a solution of 1.5 g of PVP (10,000 molecular weight) in 75 mL of EG, was added 50.1 mg of silver nitrate, stirred 12 min at 22° C. to dissolve, then heated to 120° C. over 2 hr, and held at 120° C. for 39 min to yield the Silver Seed solution. To characterize material, 11.47 g were diluted with 28.3 g of acetone, and centrifuged at 2548 rpm for 8 min. The supernatant was decanted and discarded, isopropanol added to the residue, which was redispersed by immersion in an ultrasonic bath for 5 min. An evaporated droplet of this dispersion was examined by TEM. Spheroidal particles with multiple twin planes were observed, average diameter 19.8+/−5.4 nm.

Silver Nanowire Preparation

All solutions were sparged with nitrogen before use. To a mixture of 200 mL of EG and 1.28 mL of 0.006 M iron(II) chloride tetrahydrate in EG under a nitrogen atmosphere, heated and stirred at 145° C., was added 0.29 mL of the Silver Seed solution, and then were added simultaneously in two streams 60 mL each of 0.094 M silver nitrate in EG and 0.282 M PVP in EG over 25 min. After an additional 90 min at 145° C., the reaction was cooled and worked up as in Example 3 to give the product: AgNW with lengths 5-60 microns and very few particles.

Example 6

Silver Seeds Preparation

Silver seeds were prepared using the procedure of Example 5.

Silver Nanowire Preparation

All solutions were sparged with nitrogen before use. To a mixture of 3003 mL of EG and 19.2 mL of 0.006 M iron(II) chloride tetrahydrate in EG under a nitrogen atmosphere, heated and stirred at 145° C., was added 4.35 mL of the Silver Seed solution, and then were added simultaneously in two streams a solution of 14.47 g of silver nitrate in 905 mL of EG and a solution of 83.76 g of PVP in 905 mL of EG over 25 min. After holding an additional 90 min at 145° C., the reaction was cooled and worked up as in Example 3 to give the product: AgNW with lengths 5-150 microns and only a few particles. Repetition of this reaction gave similar results.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method comprising:
   reducing at least one first portion of at least one silver ion in the presence of at least one compound to form silver particles, the at least one compound comprising at least one polymer, surfactant, or acid, wherein the silver particles have a largest dimension less than 50 nm and at least 75 number percent of the silver particles are multiply-twinned particles;
   adding the silver particles to a heated polyol under an inert atmosphere to form a composition;
   adding at least one second portion of the at least one silver ion to the composition; and
   reducing the at least one second portion of the at least one silver ion in the presence of the silver particles to form at least one silver nanowire product.

2. The method according to claim 1, wherein the at least one compound comprises polyvinylpyrrolidinone.

3. The method according to claim 1, wherein the at least one polyol comprises at least one of ethylene glycol or propylene glycol.

4. The method according to claim 1, wherein the reduction of the at least one second portion is performed in the presence of at least one second metal ion.

5. The method according to claim 4, wherein the at least one second metal ion comprises at least one iron ion.

6. The method according to claim 1, where in the reduction of the at least one second portion is performed in the presence of at least one chloride ion.

* * * * *